Oct. 31, 1972    A. J. DERVY    3,701,704
METHOD OF FABRICATING A ROCKET NOZZLE LINER
Filed May 18, 1970    5 Sheets-Sheet 1

INVENTOR.
ARAM J. DERVY
BY
-AGENT-

INVENTOR.
ARAM J. DERVY
BY
- AGENT -

Oct. 31, 1972   A. J. DERVY   3,701,704
METHOD OF FABRICATING A ROCKET NOZZLE LINER
Filed May 18, 1970   5 Sheets-Sheet 3
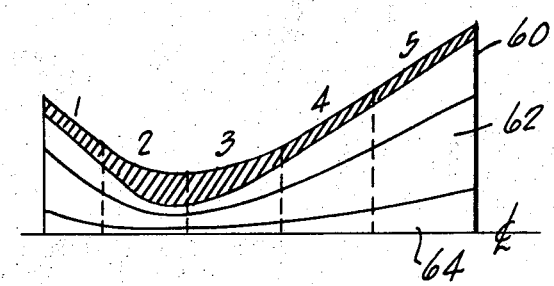
_Fig. 7A_
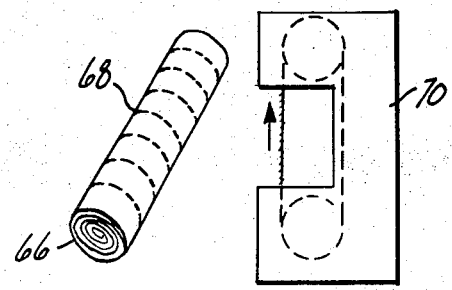
_Fig. 7B_
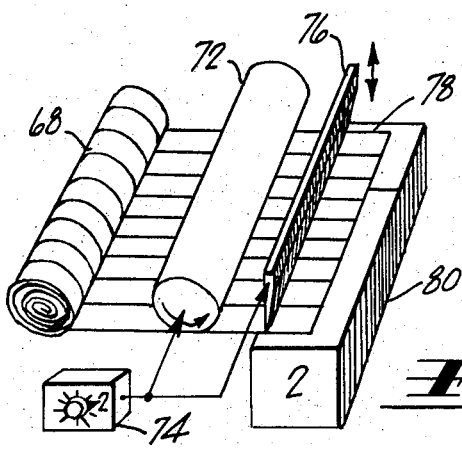
_Fig. 7C_
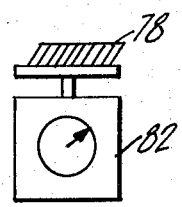
_Fig. 7D_
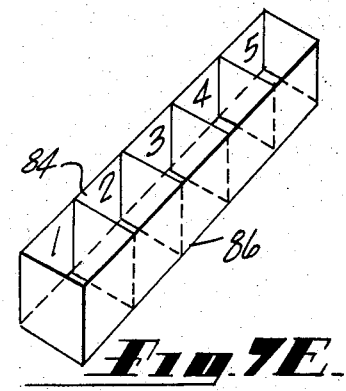
_Fig. 7E_
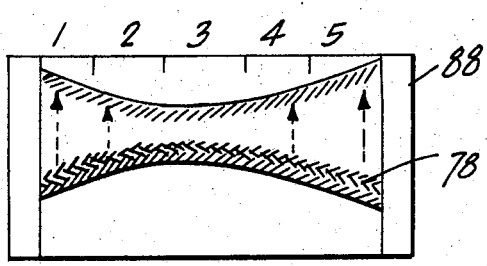
_Fig. 7F_
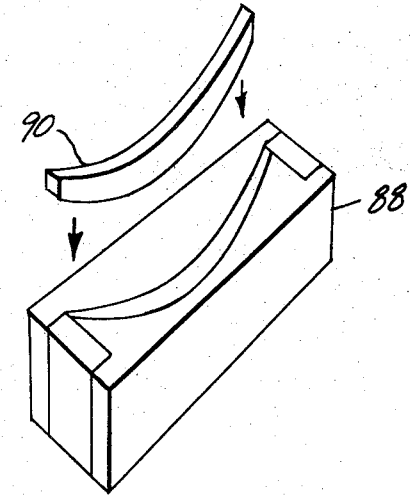
_Fig. 7G_
INVENTOR.
ARAM J. DERVY
BY
— AGENT —

Oct. 31, 1972  A. J. DERVY  3,701,704
METHOD OF FABRICATING A ROCKET NOZZLE LINER
Filed May 18, 1970  5 Sheets-Sheet 4

INVENTOR.
ARAM J. DERVY
BY
_____
-AGENT-

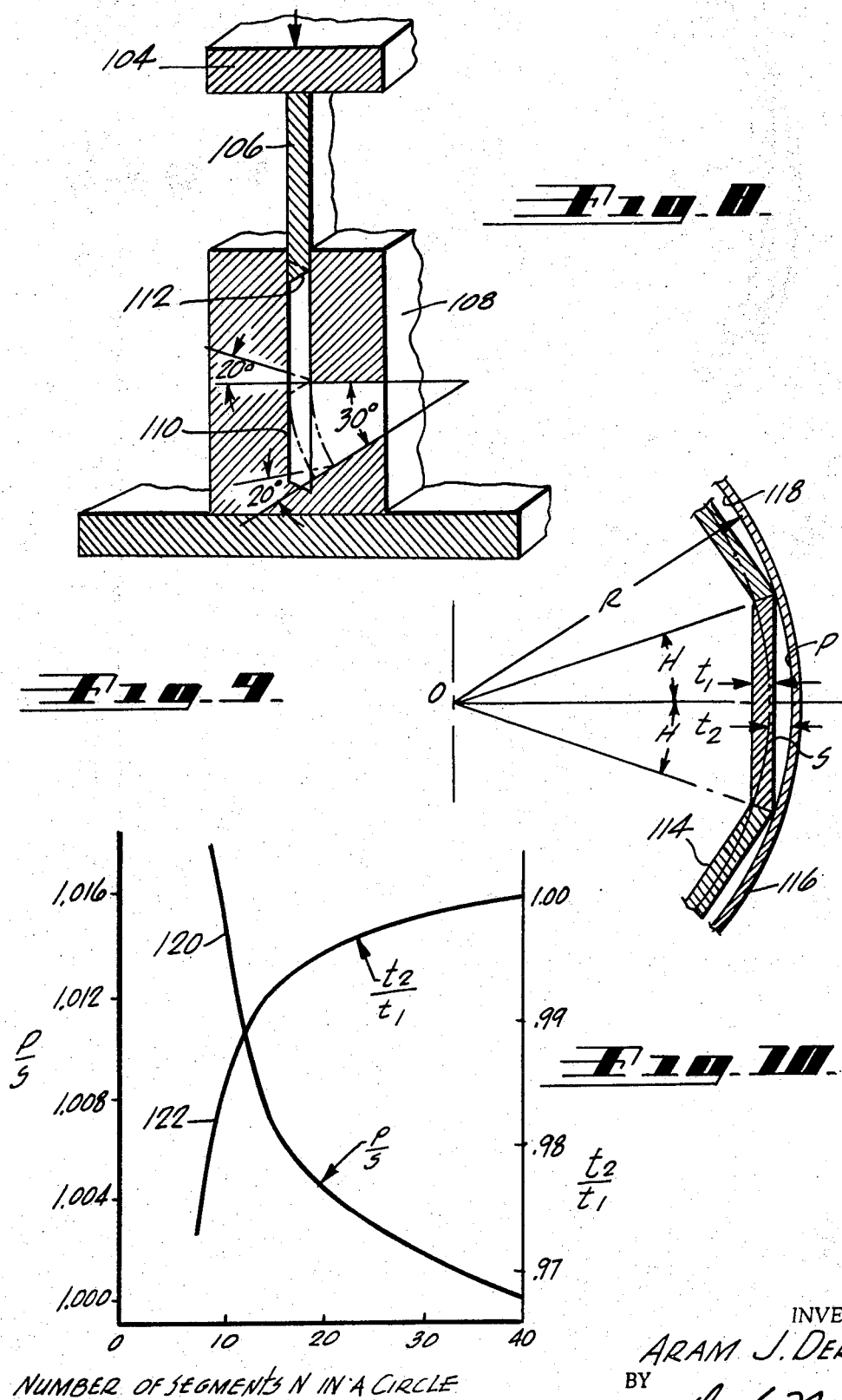

United States Patent Office 3,701,704
Patented Oct. 31, 1972

3,701,704
METHOD OF FABRICATING A ROCKET
NOZZLE LINER
Aram J. Dervy, Santa Monica, Calif., assignor to
McDonnell Douglas Corporation
Filed May 18, 1970, Ser. No. 38,264
Int. Cl. B32b 31/18, 31/20; F02k 1/24
U.S. Cl. 156—297
22 Claims

ABSTRACT OF THE DISCLOSURE

Rocket nozzle liner is formed from substantially identical longitudinal segments which have been circumferentially fused together into an integral unit. Rectangular flakes are preferably cut from cloth material having good insulative and ablative properties to provide flakes of the same width but of different lengths, the length of a flake being a function of the nozzle liner thickness at the longitudinal point where such flake is to be used. The flakes are preferably cut so that the dominant warp filaments of each flake are generally parallel to its length, and each liner segment is molded from suitably arranged flakes to provide a segment having predetermined warp filaments orientations therein.

BACKGROUND OF THE INVENTION

My present invention pertains generally to the field of rocket nozzle construction and more particularly to a novel rocket nozzle liner construction having good and durable insulative as well as ablative properties.

In a solid fuel rocket engine, the nozzle normally includes an inner liner (having suitable insulative and ablative properties) which allows the nozzle to withstand the hot exhaust blast passing through it without becoming disintegrated or destroyed. The conventional method of fabricating such a nozzle liner is to wrap tape made of a suitable material in a shingle pattern on a mandrel having an external surface corresponding to the desired internal configuration of the nozzle. The basic material used for the tape is generally a high silica glass fabric pre-impregnated with phenolic resin. This material, however, is usually supplied in the form of a roll of cloth about 3 feet wide and wherein the dominant warp filaments run parallel to the length of the cloth. The fill or woof filaments are, of course, woven around the warp filaments at right angles thereto.

Pieces of strips of several different widths must be cut from the cloth at a bias angle of about 45° to the warp filaments; i.e., at about 45° to the length of the cloth. These pieces or strips are then sewn together end-to-end to form a long tape having a width which is variable with length. The tape and mandrel are mounted on a special wrapping machine which winds the tape on the rotated mandrel at a shingle angle varying from about 5 to 90° with respect to the longitudinal axis of the mandrel (nozzle). The width of the tape being wrapped at any longitudinal (axial) point of the mandrel is, of course, a function of the nozzle liner thickness for that point. The reason for cutting the cloth at a bias and sewing the resulting pieces continuously together is to provide a tape having suitably oriented warp filaments to permit the tape to be wrapped on edge at the required shingle angle varying from about 5 to 90°.

During winding of the tape on the mandrel, heat is applied to the tape as it rolls into place. The purpose of the heat is to allow the tape to have plasticity (for ease of deformation) by softening the matrix retaining the filaments, and to make the resin tacky. A pressure roller presses the heated tape into position and a cold flow of gas located on the other side of the roller solidifies the tacky resin in place. It is necessary to wrap the tape in an environmentally controlled room since the tackiness of the resin within the tape, for a given rate or amount of applied heat, is a function of the room temperature and, where wrapping is done in an ordinary workshop, there are large variations in temperature between summer and winter, for example. After the wrapping operation is complete, the liner is enveloped in a rubber bag and placed in a hydroclave to be cured under proper pressure and temperature. The external surface of the liner is then machined (ground) to size, and the liner is finally inserted in and bonded to a supporting structural (steel) shell.

The conventional method of fabricating rocket nozzle liners as described briefly above is a proven method, and the liners produced according to such method have satisfactorily withstood the high temperatures and erosive action of the hot exhaust blast of solid fueled rocket engines. Moreover, tape-wrapped nozzle liners have a comparatively low ablation rate and are light in weight. There are, however, some serious disadvantages and problems associated with the conventional fabrication method and the resulting liners produced thereby.

The main disadvantage is that of high material and labor cost involved. The requirement of cutting the high silica glass cloth at a bias into pieces or strips of several different widths, sewing the relatively short pieces of cloth together to form a long tape, and editing the sewn tape has raised the material cost factor considerably. There is much waste of material easily amounting to 2 or 3 times the final weight of the finished liner in this method. Also, a special tape wrapping machine in an environmentally controlled room is necessary. The tape must generally be wrapped at a definite shingle angle which is varied along the longitudinal (axial) length of the nozzle liner, and there is always the problem that the tape might slip while being wrapped. Of course, circular cracking between the wrapped tape laminations or layers can subsequently occur in the finished product due to improper wrapping.

SUMMARY OF THE INVENTION

Briefly, and in general terms, my invention is preferably accomplished by providing a liner for rocket nozzles and the like wherein the liner is constructed from woven cloth material having good insulative and ablative properties, and the dominant wrap filaments of such material are properly oriented throughout the liner to provide a rocket nozzle liner construction of optimum overall durability and performance at the lowest cost.

The method of fabricating this liner includes the molding of substantially identical longitudinal segments from suitably arranged flakes which have been cut from glass, carbon, graphite or other insulative cloth pre-impregnated with a resin having good charing properties. The cloth is preferably cut to provide rectangular flakes having the same width but of different lengths, the length of a flake being a function of the nozzle liner thickness at the longitudinal point where such flake is to be used. The flakes are also preferably cut so that the dominant warp filaments of each flake are generally parallel to its length. These flakes are then appropriately arranged in a mold such that a longitudinal liner segment can be produced having warp filaments properly oriented at all portions of the segment. The completed liner is formed by circumferentially fusing together a predetermined number of the molded segments into an integral unit.

BRIEF DESCRIPTION OF THE DRAWINGS

My invention will be more fully understood, and other features and advantages thereof will become apparent, from the following description of exemplary embodiments and methods according to this invention. The description is, of course, to be taken in conjunction with the accompanying drawings, in which:

FIGS. 7A, 7B, 7C, 7D, 7E, 7F, 7G, 7H, 7I, 7J, 7K, 7L and 7M are generally diagrammatic perspective views which depict successive steps of a method for fabricating a rocket nozzle liner according to my invention;

FIG. 8 is a sectional elevation view, fragmentarily shown in perspective, of a segment molding tool for producing nozzle liner segments of a simple and, hence, low cost configuration;

FIG. 9 is a fragmentary cross sectional view of flat liner segments positioned within their structural nozzle shell before contouring (deformation) during the cure cycle; and FIG. 10 is a graph showing curves which relate the number of (equal width) flat liner segments used around a cylindrical structural shell with the ratio of the curved width of a segment to its flat width and with the ratio of the thickness after contouring of a segment to its thickness before contouring.

DESCRIPTION OF THE PRESENT EMBODIMENTS AND METHODS

Figure 1:
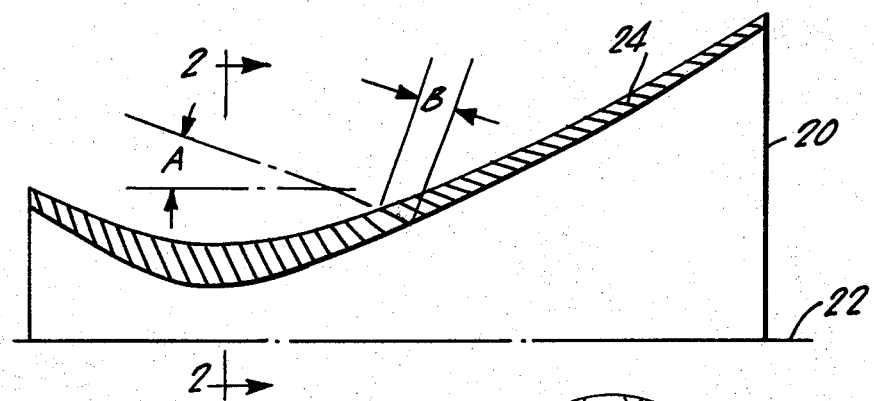
FIG. 1 is a diagrammatic longitudinal section of the upper half of a conventional rocket nozzle liner.

FIG. 1 is a longitudinal section, somewhat diagrammatically shown, of the upper half of an ablative rocket nozzle liner 20. The liner 20 is, of course, symmetrical about its axis 22 and is conventionally formed of wrapped tape 24. The tape 24 is wrapped at a shingle angle A measured, in this instance, relative to the liner axis 22 or a line parallel thereto. The shingle angle illustrated in FIG. 1 is, for example, about 20° (negative) and, as indicated, the tape 24 has a width B at that longitudinal (axial) zone of the liner 20. The basic material used for the liner 20 is a woven high silica glass fabric or cloth pre-impregnated with phenolic resin. This material is usually supplied in a roll about 3 feet wide. Tape pieces or strips of several different widths are cut from the cloth at a bias of about 45° to the warp filaments; i.e., at about 45° to the length of the cloth. Since these cut segments are relatively short, they are sewn together end-to-end to form a continuous tape of desired length and variable width.

The width of the tape is varied with length and is a function of the nozzle liner 20 thickness at a corresponding longitudinal zone to be produced by the wrapped tape. The reason for cutting the cloth at a bias and sewing the resulting pieces continuously together is to provide a tape having suitably oriented warp filaments to allow the tape to be wrapped on edge at a shingle angle A varying from 5 to 90° longitudinally along the liner axis 22. Unacceptable erosion of the inner surface of the liner 20 from a hot exhaust blast would otherwise occur since the warp filaments are the dominant ones, and the fill or woof filaments which weave around the warp filaments are less resistant to the exhaust blast.

Figure 2:
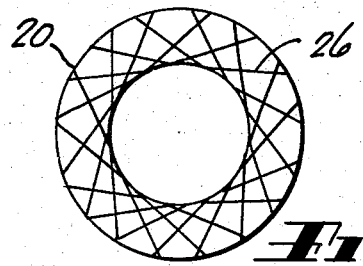
FIG. 2 is a cross sectional view of the conventional liner as taken along the line 2—2 indicated in FIG. 1.

FIG. 2 is a cross sectional view of the liner 20 as taken along the line 2—2 indicated in FIG. 1. Tape filaments 26 are generally oriented as shown. In the conventional tape wrap process using biased tape, the tape plane of wrap is oriented at the desired or proper shingle angle but not the filaments thereof. The effect of improper filament orientation is an increase in erosion of the nozzle liner 20 inner surface when subjected to high speed gas flows (normally carrying metallic particles) of high temperature. Thus, proper orientation of the filaments in the liner 20 rather than proper orientation of the plane of wrap is advantageous.

Figure 3:
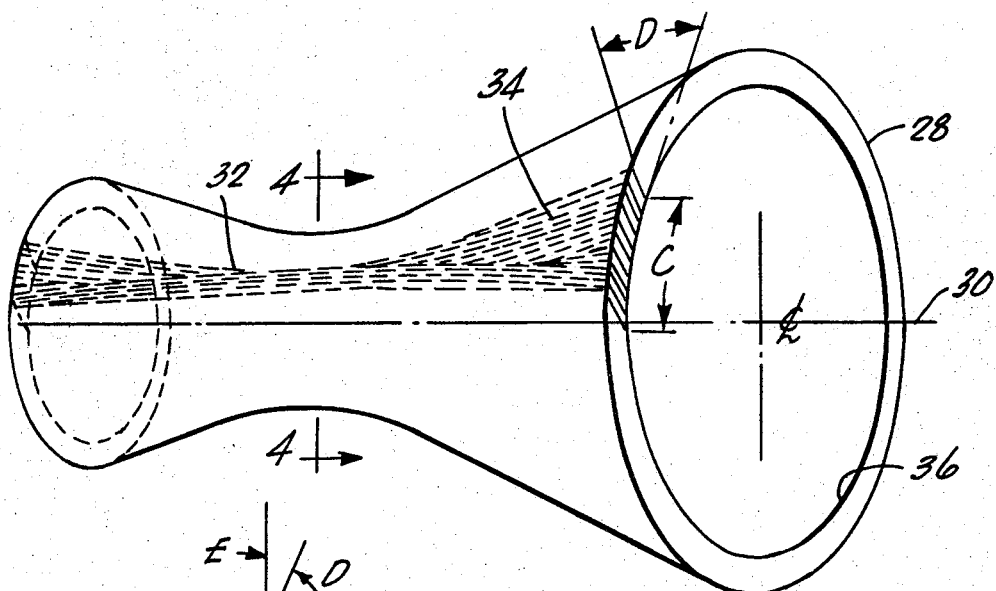
FIG. 3 is a diagrammatic perspective view of a rocket nozzle liner having a construction in accordance with my invention.

FIG. 3 is a diagrammatic perspective view of an illustrative rocket nozzle liner 28 having a construction in accordance with my invention. The liner 28 is symmetrical about its axis 30 and is fabricated of a number of substantially identical longitudinal segments 32 which have been circumferentially fused together into an integral unit. Each segment 32 was molded from rectangular flakes 34 of, for example, high silica glass fabric C–100–96 pre-impregnated with 30% (by weight) phenolic resin DP–24–2 (Ironside) with 12.5% (by weight of resin) Buna-N rubber. Use of an elastomer such as Buna-N considerably improves (reduces) the erosion rate. The flakes 34 were cut from a roll of high silica glass cloth and preferably are of constant (the same) width but of different lengths, the length of a flake being a function of the nozzle liner thickness at the longitudinal (axial) zone where such flake is used. The flakes 34 can be cut in a rectangle, parallelogram or other shape. In the parallelogram shape, for example, the warp filaments can run parallel to the flake sides or edges which are slanted at a selected shingle angle. The flakes 34 can also be cut from carbon, graphite, asbestos or other insulative cloth which have been pre-impregnated with a resin having good charring properties. It can be seen that each segment 32 has a circumferential width C which is usually variable over the longitudinal length of the segment. Also, the plane of each flake 34 is generally oriented at a constant pitch or inclination angle D which is measured with respect to a plane tangent to the inner surface 36 of the liner 28 along the inner edge of the flake.

Figure 4:
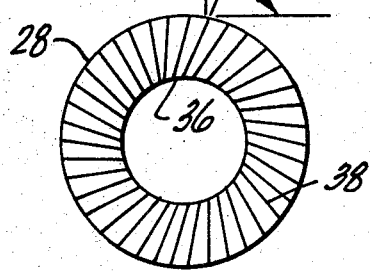
FIG. 4 is a cross sectional view of the liner shown in FIG. 3, as taken along the line 4—4 indicated therein.

FIG. 4 is a cross sectional view of the liner 28 as taken along the line 4—4 indicated in FIG. 3. Warp filaments 38 are generally oriented radially at an inclination angle D of 90° or at a uniform predetermined inclination angle D off the radial as illustrated. The complement of the inclination angle D is spiral angle E. Increasing the spiral angle E (decreasing the inclination angle D) would, of course, increase the hoop component of the warp filaments 38 (within the flakes 34) in the circumferential hoop direction. This would then increase the strain and stress in the hoop direction. The fill or woof filaments weave around the warp filaments 38, of course, at right angles thereto and have not been shown in FIG. 4 since they would appear merely as tiny dots. The warp filaments of the conventional liner 20 structure of FIG. 2 are oriented at a much smaller or flatter inclination angle and less uniformly than those of the liner 28 structure of FIG. 4. Since the warp filaments are the dominant ones, the liner 28 structure can better withstand the heat and erosive action of an exhaust blast flowing therethrough. At the radially inner section of the liner 28, the warp filaments 38 are subjected to temperatures of about 6000° F. and erosive gas velocities of the order of Mach 1 and above. At the radially outer section of the liner 28, however, the warp filaments 38 are still relatively cool and thus well anchored to prevent the liner from disintegrating in and torn apart by the hot exhaust blast.

Figure 5:
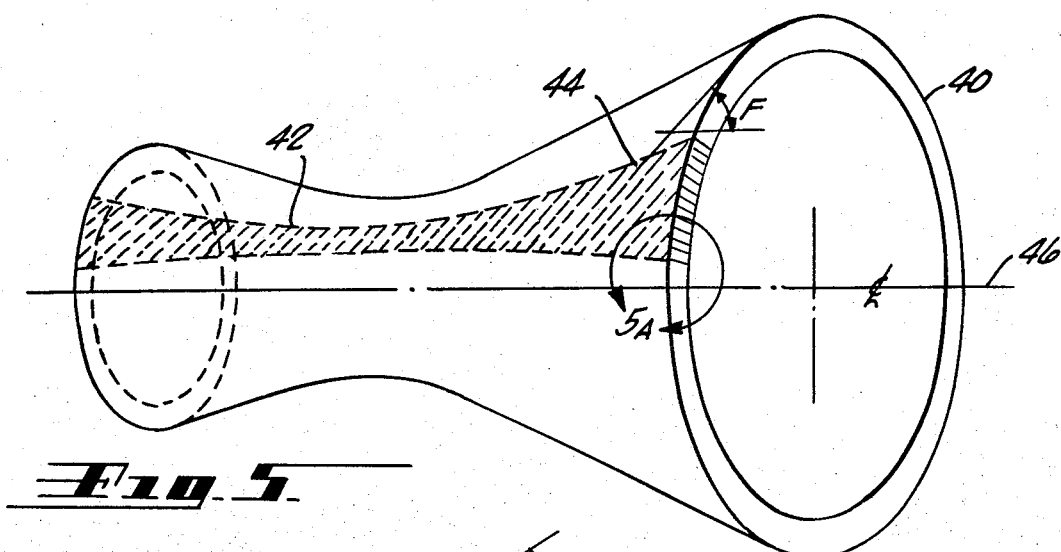
FIG. 5 is a diagrammatic perspective view of a rocket nozzle liner having another (modified) construction according to this invention.

FIG. 5 is a diagrammatic perspective view of a rocket nozzle liner 40 having a modified construction including segments 42 molded from flakes 44 oriented differently than the flakes 34 in the liner 28 of FIG. 3. The liner 40 has a similar construction to the liner 28 in that a number of substantially identical longitudinal segments 42 have been circumferentially fused together to form an integral unit. As indicated in FIGS. 3 and 4, however, the flakes 34 of segment 32 are generally arranged so that their planes are approximately parallel longitudinally to the axis 30 of the liner 28 and the warp filaments in the flakes have a spiral angle E. Whereas, as indicated in FIG. 5, the flakes 44 of segment 42 are generally arranged so that their planes are approximately at a bank or offset angle F measured with respect to a line (or plane) parallel to axis 46 of the liner 40 and the warp filaments in the flakes have a spiral angle of 0°.

Figure 5A:
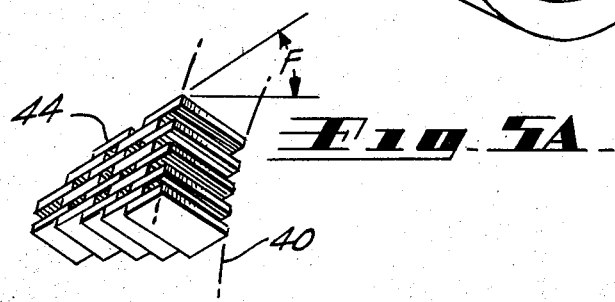
FIG. 5A is a fragmentary and enlarged perspective view of the liner construction of FIG. 5, as taken along the line 5A—5A indicated therein.

FIG. 5A is a fragmentary and enlarged perspective view of the construction of the segment 42 was taken along the line 5A—5A indicated in FIG. 5. The flakes 44 are positioned so that the plane of each flake is oriented generally at the offset angle F from a line parallel to the axis 46 of the liner 40. The dominant warp filaments of the flakes 44 are generally aligned radially such that the radially outer filament ends are well anchored in the relatively cool outer section of the liner 40. In addition, the planes of the flakes 44 are generally inclined at the angle F against the axial direction flow of the hot exhaust blast passing through the liner 40. This reduces the separation tendency between flakes 44 at points where the flakes may not be thoroughly fused together. It has been found from tests, however, that it is usually unnecessary to orient the flakes of a segment at any significant offset angle F (which corresponds to a significant shingle angle A in FIG. 1) in order to obtain segments or a liner that is adequately strong and durable.

Figure 6:
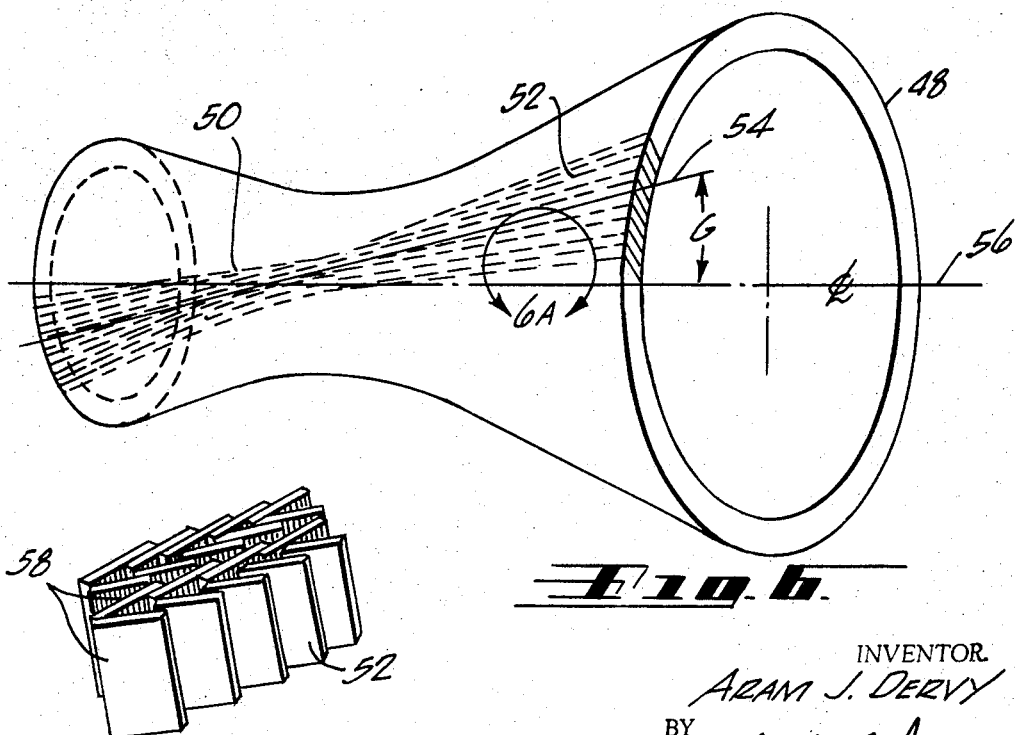
FIG. 6 is a diagrammatic perspective view of a rocket nozzle liner having yet another construction in accordance with this invention.

FIG. 6 is a diagrammatic perspective view of a rocket nozzle liner 48 having another modified construction of its longitudinal segments 50. The liner 48 is similar to the liner 28 of FIG. 3 in that a number of substantially identical longitudinal segments 50 are circumferentially fused together into an integral unit. Each segment 50 is molded from flakes 52 which are suitably arranged so that their planes are oriented in a longitudinal direction generally parallel to the central axis 54 of the segment. The segment axis 54, however, is oriented at a helical angle G with respect to a line parallel to the liner axis 56. In this instance, the entire segment 50 is thus oriented off-axis at a segment yaw or helix angle G from the axial direction flow of the hot exhaust blast passing through the liner 48. This reduces the tendency for the segments 50 to be separated at their longitudinal junctions, particularly at those junctions which may not have been thoroughly fused together during the curing operation or cure cycle. Change of the segment helix angle G alters the general bank or offset angle of the flakes 52 indicated in the segment 50, of course. Similarly, change of the yaw angle of a flake alters the shingle angle (FIG. 1) of its warp filaments.

Figure 6A:
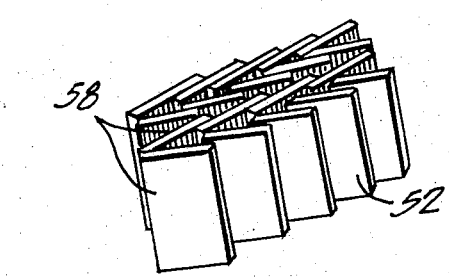
FIG. 6A is a fragmentary and enlarged perspective view of the liner construction of FIG. 6, as taken along the line 6A—6A indicated therein.

FIG. 6A is a fragmentary and enlarged perspective view of the construction of the segment 50 as taken along the line 6A—6A indicated in FIG. 6. The flakes 52 were laid in the illustrated shingle pattern in an open molding tool. For a particular longitudinal zone of the segment 52, stacks of the flakes 52 were spread out in layers 58 wherein successive flakes in a layer overlap their respectively preceding ones. The layers 58 can be formed from flake stacks spread out alternately in one longitudinal direction and then in the other. Of course, the stacks can be all spread out in the same longitudinal direction if desired. However, the flakes 52 in contiguous layers 58 are inclined in opposite directions (angles) where the stacks are alternately spread out in different longitudinal directions. This tends to give a better balance in flake orientation in the segment 50. Actually, though, after the molding operation (heating and compressing), the flakes and layers thereof in either arrangement are solidly and tightly fused integrally together with little, if any, resultant differences in segment (and liner) performance or durability. It is noted that the flakes 52 and, consequently, the layers 58 can be oriented at an offset angle F (FIG. 5) instead of generally parallel to the segment axis 54.

Figure 7H:
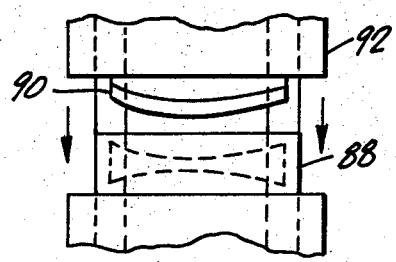
Figure 7I:
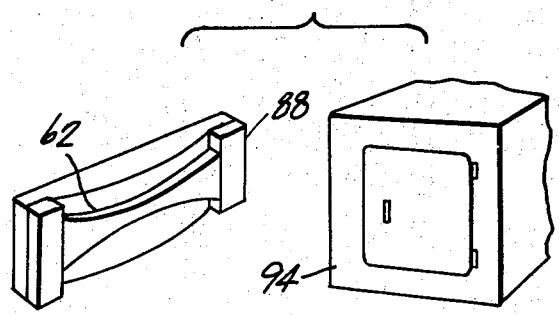

FIGS. 7A through 7M are diagrammatic sectional and perspective views illustrating the different steps of a method for fabricating a rocket nozzle liner according to my invention. In FIG. 7A, the design drawing of the upper half of a longitudinal section of a symmetrical nozzle liner 60 is shown. The liner 60 is preferably divided into a number of equal width segments 62 having longitudinal (axial) zones 64 which are labeled or identified as zones 1, 2, 3, 4 and 5, for example. For each zone 64, the segment volume or mass is determined and from this the necessary weight of flakes required for each segment zone is calculated. Rectangular flakes are preferably used and, by holding the width of the flakes constant, the maximum flake length required in each zone is also determined from the design drawing. The constant width of the flakes is, of course, selected so that the flakes can conform accurately to all curvatures of the liner 60.

In FIG. 7B, a wide roll 66 of insulative and ablative cloth is suitably clamped and then sliced or cut into a number of narrow rolls 68 of constant (the same) width tape by cutting means 70 which can be a saw. The rolls 68 of tape are rotatably mounted as indicated in FIG. 7C, and can be simultaneously drawn out by a drive roller 72 which is periodically actuated by control means 74. The control means 74 also periodically actuates a cutter 76. Thus, the control means 74 is set so that the roller 72 periodically drives off the selected length of tape from the rolls 66 and, when stopped, the cutter 76 is then actuated by the control means to cut the tapes into flakes 78 which are caught in receptacle 80. After the cutting operation (when the cutter 76 has been raised), the control means 74 again actuates the roller 72 to repeat the cycle. Other flakes 78 of different lengths are similarly obtained by resetting the control means 74 as desired. Of course, a different receptacle 80 is preferably used to collect the flakes 78 of a different length.

In FIG. 7D, flakes 78 of a particular length are weighed on scale 82 to obtain the amount required for a corresponding zone 64 (FIG. 7A). The weighed flakes 78 are then stacked and placed in the correspondingly labeled compartment 84 of bin 86 shown in FIG. 7E. The appropriately filled bin 86 forms a kit of flakes 78 for one longitudinal liner segment 62. The flakes 78 in the bin 86 are used to fill the molding tool 88 which has been opened and clearly marked as to the locations of the different zones as indicated in FIG. 7F. The tool 88 is heated to about 150° F. (for phenolic resin), for example, and the stacks of flakes 78 are removed from the compartments 84 of bin 86 and laid in shingle fashion in their proper locations in accordance with the zone markings on the tool. The tool 88 is then assembled and placed in an oven (not shown) with a dead weight which can be ram 90 on the flakes 78 as illustrated in FIG. 7G. It should be noted that the internal surfaces of the molding tool 88 and the external surfaces of the ram 90 are coated with baked-on Teflon, for example, or other suitable parting agent.

After about a 4-hour soak period (variable with size of part) at a temperature of about 150° F. (for phenolic resin), during which period the flakes 78 are closely nestled together and compacted to some extent in the molding tool 88, the tool is removed from the oven and transferred hot to a press 92 as shown in FIG 7H. Force is applied on the ram 90 until it closes against stops. A load of 5 tons is applied (about 300 p.s.i. on the flakes 78) for 5 minutes, for example. The tool 88 is then placed in a refrigerator 94 until cold (32 to 35° F.) when the tool is opened as in FIG. 7I and the pre-formed segment 62 is removed and placed in the refrigerator for cold storage at about 40° F. The involved surfaces of the tool 88 and ram 90 are wiped with acetone to remove all residue resins and the cycle can be repeated to make another segment 62.

This pre-forming operation results in segments with 90 to 95% of the density of such segments after a 1000 p.s.i. hydroclave cure. For example, the densities of certain tested pre-formed segments varied from 0.0556 to 0.0573 lb./cu. in. The densities of these segments after a 1000 p.s.i. hydroclave cure were from 0.0595 to 0.0596 lb./cu. in. with a resin content of 32.7%. Hence, densifications of the pre-formed segments was about 83% of final (hydroclave cure) density. It has been found that if a compacting density of about 90% is obtained in a liner segment, its erosion properties are the same as in the segment when it is cured at 200 p.s.i. in an autoclave or 1000 p.s.i. in a hydroclave. Thus, it is possible to eliminate the autoclave or hydroclave cure cycles described below and utilize only vacuum bag (atmospheric pressure thereon) cure in a conventional oven. This, of course, results in a very substantial cost savings.

Figure 7J:
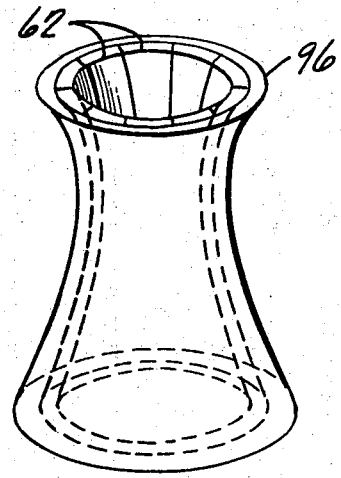

When the required number of segments 62 for formation of the nozzle liner 60 has been made, fabrication of a nozzle can be started. The segments 62 are wiped lightly with a rag which was immersed in acetone. This insures clean faces (white gloves are necessary at this stage) on the segments 62 which are then assembled in a metal structure shell 96 placed in a suitable mounting tool (not shown) as illustrated in FIG. 7J. Adhesive paste can be used for tacking the segments 62 in place within structural shell 96. Bands of aluminum strips (also not shown) of about 1/16 x 1 inch in cross section are applied over the length of the junction lines between adjacent segments 62. These can be held in place with masking tape. The aluminum strips should have rounded corners. Perforated steel straps can be used instead along the lengths of the segment junction lines.

Figure 7K:
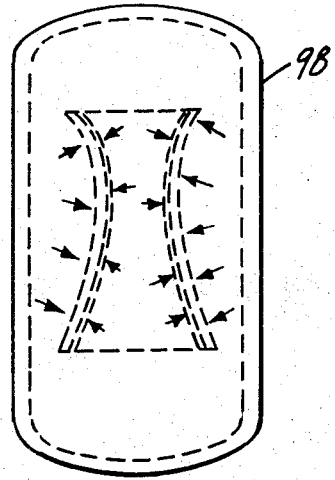

Next, a silicone impregnated glass cloth (not shown) is applied over the internal surfaces of the assembled segments 62 and, over the glass cloth, a bleeder cloth is applied. Thermocouples (also not shown) are suitably located 180° apart at the longitudinal center of the assembled segments 62 and their leads are fed out through vacuum lines of the mounting tool. The mounting tool (not shown) containing the shell 96 with its assembled segments 62 are suitably rubber-bagged and placed in an autoclave or hydroclave pressure tank 98 as indicated in FIG. 7K. The vacuum lines of the mounting tool connect with vacuum lines of the tank 98 and, when the rubber-bagged part is vacuum-drawn, the rubber bagging is drawn against the parts surfaces including the internal surfaces of the assembled segments 62. A regular autoclave or hydroclave cure is then given to the rubber-bagged and vacuum-drawn part. During the cure cycle, resin flow occurs between segments 62 which then fuse integrally together. It is possible, of course, to omit use of a mounting tool with the smaller nozzles.

Figure 7L:
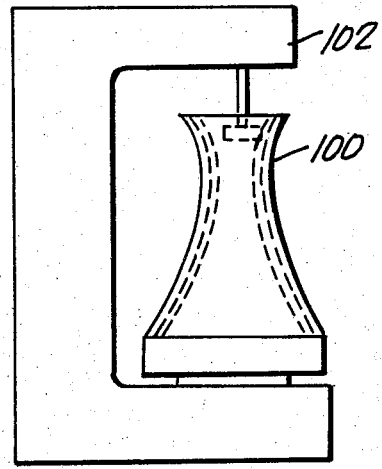
Figure 7M:
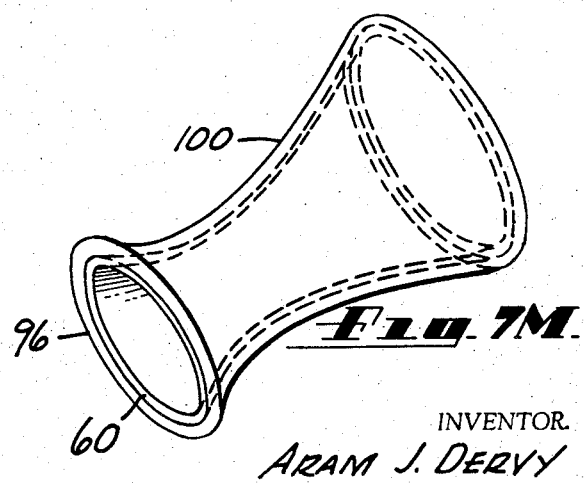

After the cure (i.e., polymerization of resin), a nozzle 100 including structural shell 96 and an integral liner 60 is obtained. The internal surface of the integral liner 60 can be ground precisely to its required configuration by a suitable grinding machine 102 as shown in FIG. 7L. The completed nozzle 100 is prespectively illustrated in FIG. 7M. It should be noted that, before the cure cycle, the segments 62 can be manually sawed and cut easily. This cannot be done after polymerization of the resin (which starts to occur at about 180° F. for phenolic resin). This may be desirable or necesary to fit the segments 62 perfectly in the shell 96 (FIG. 7J). It should be also be noted that macerated pre-impregnated materials instead of the flakes 78 (FIG. 7F) can be used as the basic material to form the segments 62; however, such segments would not have the greater strength and erosion resistance as the flake-formed segments. It is essential that any material used be pre-impregated with resin to allow pre-forming; i.e., forming it to a desired and workable shape without polymerizing or curing the resin.

FIG. 8 is a sectional elevation view, fragmentarily shown in perspective, of a segment molding tool 104 for producing nozzle liner segments of simple configuration. Ram 106 working in cooperation with die 108 (suitably filled with flakes) produces flat longitudinal segments having a constant trapezoidal cross section. The trapezoidal cross section is indicated by the space 110 below the lower end 112 of the ram 106 in its closed position. A circumferentially curved 30° segment having a 20° spiral angle, for example, can be obtained by curving the lower portion of the space 110 in die 108 and reversing the slope of the lower end 112 of ram 106 to those indicated by phantom lines in FIG. 8. The circumferentially curved segments would, of course, fit closely within their cylindrical structural shell.

It is also possible to laminate fabric in the flat with the warp filaments of all plies running in the same direction, then putting the laminate in a press heated to 150° F. and pre-forming a rectangular billet. A forming mold need not be used to laminate the fabric. After freezing, the billet can be cut into convenient flat segments each having a desired or proper warp filament orientation This technique is applicable particularly well to large diameter nozzles where the flatness of the segments is small compared to the radius of the nozzle. It is, of course, possible to make rectangular (or other) billets out of macerated material (suitably impregnated with resin) using rectangular (or other) forming molds and then cutting such billets into segments of the desired shape.

FIG. 9 is a fragmentary cross sectional view of flat longitudinal segments 114 positioned within their cylindrical structural shell 116 before deformation during the cure cycle. The curved inner surface 118 of the cylindrical shell 116 has a radius R and each segment 114 has a central (sector) angle equal to 2H. For a number N of substantially identical segments 114 positioned around the inner perimeter or circumference of the shell 116, then $2H = 360°/N$. After a regular (hydroclave) cure, the segments 114 of thickness $t_1$ are deformed and curved against the inner surface 118. The chord length S of each flat segment 114 then has an arc length P, and the segment thickness $t_1$ before contouring is decreased (since P is greater than S) to a thickness $t_2$ due to the generally uniform deformation under radial fluid (liquid) pressure. The arc length P is, of course, the curved width of each deformed segment and it can be seen from FIG. 9 that $P = 2HR$. Also, $S = 2R \sin H$ so that $P/S = H/\sin H$. Obviously, it would be desirable to have P and S equal in order that the amount of deformation of the segments 114 become minimal as they conform to the curved inner surface 118 during the cure cycle. This however, implies that the number N of segments 114 should be relatively large such that H will be small since, for small values of H, sin H approaches and is almost equal to H.

During the regular cure cycle, pressure is applied over the segments 114 at about 150° F. in order to mold them to the contour of the inner surface 118 of the shell 116. In general, up to the 150° F. temperature phase of the cure cycle, the volume of a segment 114 remains practically unchanged. From FIG. 9, segment volume before contouring $V_1$ is approximately equal to $St_1$ and segment volume after contouring $V_2$ is approximately equal to $Pt_2$. For $V_2 = V_1$, $Pt_2 = St_1$ and $t_2/t_1 = S/P$. Since, from above, $P/S/H/\sin H$, then $t_2/t_1 = \sin H/H$. This ratio of liner to segment thickness is thus similar to the ratio of liner to segment widths or circumferential lengths.

FIG. 10 is a graph showing curves 120 and 122 which are respective plots of the ratios $P/S$ and $t_2/t_1$ against N, the number of equal width segments arranged in a circle (cylindrical shell 116). It can be seen that below $N \approx 20$, the rate of change of the slope of each of the curves 120 and 122 begins to increase significantly. It is desirable to use flat segments 114 instead of contoured or curved ones in order to achieve the lowest cost in fabricating a nozzle liner. Obviously, the less the number of equal width segments 114 used in their structural shell 116, the lower will be the manufacturing cost. However, the less the number of segments 114 used, the greater will be the difference between the width of each segment (chord length S) and its deformed width after curing (arc length P). Thus, for lowest manufacturing cost and keeping the deformation of the segments 114 to an optimum minimal, the number N of flat segments 114 for a cylindrical shell 116 should be about 20. No more than about 20 should or need be used, and less than about 20 can be used according to the deformation properties of the segments 114. A range of about 15 to 20 for the number N, for example, is generally satisfactory for the illustrative geometry and materials shown and described above.

While the flat segments 114 have been illustratively used with a cylindrical structural shell 116, such segments can be similarly used in a shell of a different configuration. An elliptical shell, for example, can be used. In this instance, the number of flat and identical segments required can be determined by using the greatest curvature portions to establish the maximum segment width permissible for forming the liner. Alternatively, groups of different width segments can be used for the respective configuration portions of different curvatures. Of course, empirical methods can always be used where necessary to establish segment number and dimensions.

The methods of fabrication discussed herein can, for example, be also applied in making external ablative heat shields or pressurized containers or vessel hulls. Materials with good ablative properties or good structural properties can be used as appropriate. Thus, it is to be understood that the exemplary embodiments of this invention and the methods of fabricating the same as described above and shown in the accompanying drawings are merely illustrative of, and not restrictive on, the broad invention and that I do not desire to be limited in my invention to the exact details or steps of construction or fabrication shown and described, for obvious modifications will occur to persons skilled in the art.

I claim:

1. In the fabrication of a structural part for at least a portion of a rocket engine nozzle liner or the like, the method which comprises the steps of:
    shaping material having selected properties into a predetermined condition, said material including sheet material comprising fabric having dominant warp filaments therein, and flakes are shaped from said sheet material;
    arranging said shaped flakes in a predetermined pattern in a forming tool, said tool having a configuration for forming said structural part and said flakes having a relatively small size plane as compared to cross and longitudinal sectional planes of said structural part; and
    forming said structural part from said arranged flakes with said tool.

2. The invention as defined in claim 1 wherein said flakes are shaped into rectangular flakes in which said dominant filaments are generally parallel to the length of said rectangular flakes.

3. The invention as defined in claim 2 wherein said rectangular flakes have the same width, and lengths which are variable in accordance with the thickness of said structural part as may vary along a selected direction thereof.

4. The invention as defined in claim 1 wherein said flakes are arranged in contiguous layers in said tool, each of said layers having its flakes arranged in a shingle pattern.

5. The invention as defined in claim 1 further comprising the steps of:
    fabricating additional structural parts to provide a predetermined number of said structural part, said structural parts being substantially identical longitudinal segments of at least a circumferential portion of an axial length zone of said rocket engine nozzle liner or the like; and
    fusing said predetermined number of structural parts together into an integral unit wherein they comprise said longitudinal segments of said circumferential portion of said axial length zone.

6. The invention as defined in claim 5 wherein said shaped flakes are rectangular flakes in which said dominant filaments are generally parallel to the length of said rectangular flakes, and said rectangular flakes are arranged in contiguous layers in said tool with the length of said rectangular flakes generally positioned perpendicularly to the longitudinal plane of said structural part being formed by said tool whereby said dominant filaments are oriented in each of said longitudinal segments to extend substantially straight across the thickness thereof.

7. The invention as defined in claim 6 wherein said longitudinal segments have substantially flat longitudinal surfaces and said predetermined number of flat longitudinal segments is in a range established from geometric and deformation properties thereof, whereby said flat longitudinal segments can be positioned circumferentially within a structural shell and fused together under pressure into an integral unit against said shell with deformation of said segments kept to an optimum minimal.

8. The invention as defined in claim 5 wherein the plane of each of said flakes is generally oriented at a predetermined constant inclination angle which is measured with respect to a plane tangent to the inner surface of said liner or the like, and said flakes are arranged so that their planes are oriented in a longitudinal direction generally parallel to the central axis of said liner or the like.

9. The invention as defined in claim 5 wherein the plane of each of said flakes is generally oriented at a predetermined offset angle which is measured with respect to a line parallel to the central axis of said liner or the like, whereby the planes of said flakes are generally inclined at said offset angle against the axial direction flow of any hot exhaust blast passing through said liner or the like.

10. The invention as defined in claim 5 wherein the longitudinal axis of each of said segments is generally oriented at a predetermined helix angle which is measured with respect to a line parallel to the central axis of said liner or the like.

11. The invention as defined in claim 10 wherein said flakes are arranged in contiguous layers in said tool for forming said structural part, each of said layers having its flakes arranged in a shingle pattern and each successive one of said layers having a shingle pattern of flakes which overlap in a direction opposite to that of the shingle pattern of its preceding layer.

12. In the fabrication of a structural part for at least a portion of a rocket engine nozzle liner or the like, the method which comprises the steps of:
    shaping material having selected properties into a predetermined condition, said material including filament therein and impregnated with a resin;
    arranging said shaped material in a predetermined pattern in a forming tool, said tool having a configuration for forming said structural part;
    forming said structural part from said shaped material with said tool at a predetermined temperature below curing temperture of said resin;
    fabricating additional similar structural parts to provide a predetermined number of said structural part, said structural parts being substantially identical longitudinal segments of at least an axial length zone of said rocket engine nozzle liner or the like; and
    fusing and curing said predetermined number of structural parts together into an integral unit at a predetermined temperature and under a predetermined pressure, said longitudinal segments being circumferentially fused together in said integral unit.

13. The invention as defined in claim 12 wherein said longitudinal segments have cylindrical radially inner and outer longitudinal surfaces.

14. The invention as defined in claim 12 wherein said longitudinal segments have substantially flat longitudinal surfaces.

15. The invention as defined in claim 14 wherein said predetermined number of flat longitudinal segments is in a range established from geometric and deformation properties thereof, whereby said flat longitudinal segments can be positioned circumferentially within a structural shell and fused together under pressure into an integral unit against said shell with deformation of said segments kept to an optimum minimal.

16. The invention as defined in claim 15 wherein said established range is from about 15 to about 20, and said segments are positioned circumferentially within a cylindrical structural shell.

17. In the fabrication of a structural part for at least a portion of a rocket engine nozzle liner or the like, the method which comprises the steps of:
shaping material having selected properties into a predetermined condition, said material including filaments therein and impregnated with a resin;
arranging said shaped material in a predetermined pattern in a forming tool, said tool having a configuration for forming said structural part;
forming said structural part from said shaped material with said tool at a predetermined temperature below curing temperature of said resin;
fabricating additional similar structural parts to provide a predetermined number of said structural part, said structural parts being substantially identical longitudinal segments of at least a circumferential portion of an axial length zone of said rocket engine nozzle liner or the like; and
fusing and curing said predetermined number of structural parts together at a predetermined temperature and under a predetermined pressure into an integral unit wherein they comprise said longitudinal segments of said circumferential portion of said axial length zone, said structural parts being formed with at least a densification of approximately 90% of final cured density whereby said structural parts can be fused together and cured under pressure as low as atmospheric value pressure.

18. The invention as defined in claim 17 wherein said longitudinal segments have substantially flat longitudinal surfaces and said predetermined number of flat longitudinal segments is in a range established from geometric and deformation properties thereof, whereby said flat longitudinal segments can be positioned circumferentially within a structural shell and fused together under pressure into an integral unit against said shell with deformation of said segments kept to an optimum minimal.

19. The invention as defined in claim 18 wherein said material is shaped into a macerated condition prior to arrangement in a predetermined pattern in said forming tool.

20. The invention as defined in claim 18 wherein said material comprises sheet material including dominant warp filaments therein and impregnated with a resin, and flakes are shaped from said impregnated sheet material.

21. The invention as defined in claim 20 wherein said shaped flakes are rectangular flakes in which said dominant filaments are generally parallel to the length of said rectangular flakes, and said rectangular flakes are arranged in contiguous layers in said tool with the length of said rectangular flakes generally positioned perpendicularly to the longitudinal plane of said structural part being formed by said tool whereby said dominant filaments are oriented in each of said longitudinal segments to extend substantially straight across the thickness thereof.

22. In the fabrication of a structural part for at least a portion of a rocket engine nozzle liner or the like, the method which comprises the steps of:
shaping material having selected properties into a predetermined condition, said material including filaments therein and impregnated with a resin;
arranging said shaped material in a predetermined pattern in a forming tool, said tool having a configuration for forming said structural part;
forming said structural part from said shaped material with said tool at a predetermined temperature below curing temperature of said resin;
cutting said structural part into a number of segments of predetermined configuration; and
fusing and curing said number of segments together into an integral unit at a predetermined temperature and under a predetermined pressure, said structural part being formed with at least a densification of approximately 90% of final cured density whereby said cut segments can be fused together and cured under pressure as low as atmospheric value pressure.

References Cited
UNITED STATES PATENTS

| | | | |
|---|---|---|---|
| 3,135,297 | 6/1964 | Nordberg et al. | 60—200 A |
| 3,142,960 | 8/1964 | Bluck | 60—200 A |
| 3,210,233 | 10/1965 | Kummer et al. | 60—200 A |
| 3,083,864 | 4/1963 | Young | 60—200 A |

OTHER REFERENCES

Products Bulletin, H. J. Thompson Fiber Glass Co., Nov. 21, 1957 "Astrolite."

BENJAMIN A. BORCHELT, Primary Examiner

J. V. DORAMUS, Assistant Examiner

U.S. Cl. X.R.
60—35.6 NA, 200 A